Jan. 22, 1963  C. R. HODGEKIN  3,074,760
SHOCK ABSORBING COUPLING AND SAFETY SEAT
BELT EMBODYING THE SAME
Filed Sept. 21, 1960  2 Sheets-Sheet 1
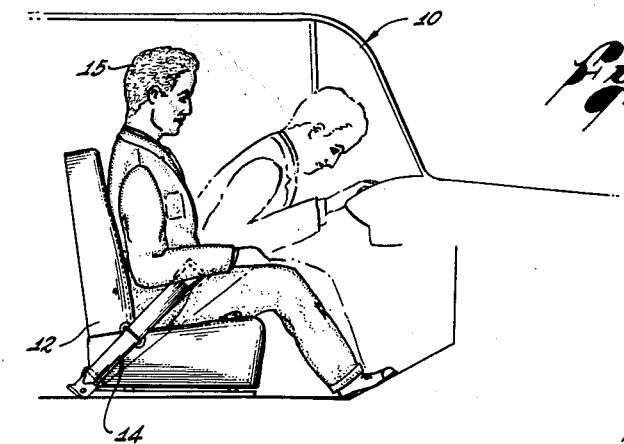
Fig. 1
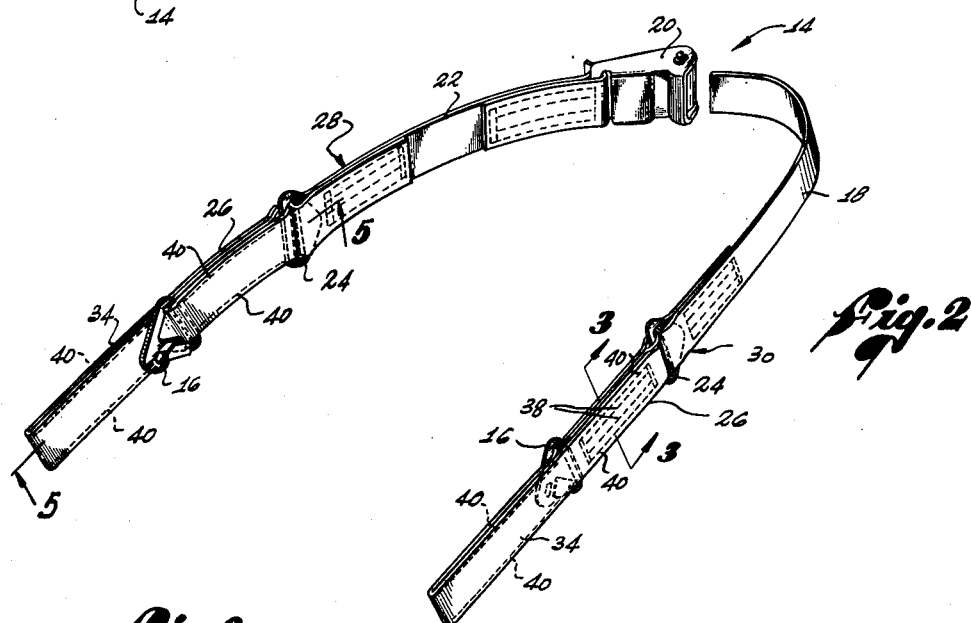
INVENTOR.
CHARLES R. HODGEKIN
BY Lilly & Nyhagen
Attorneys

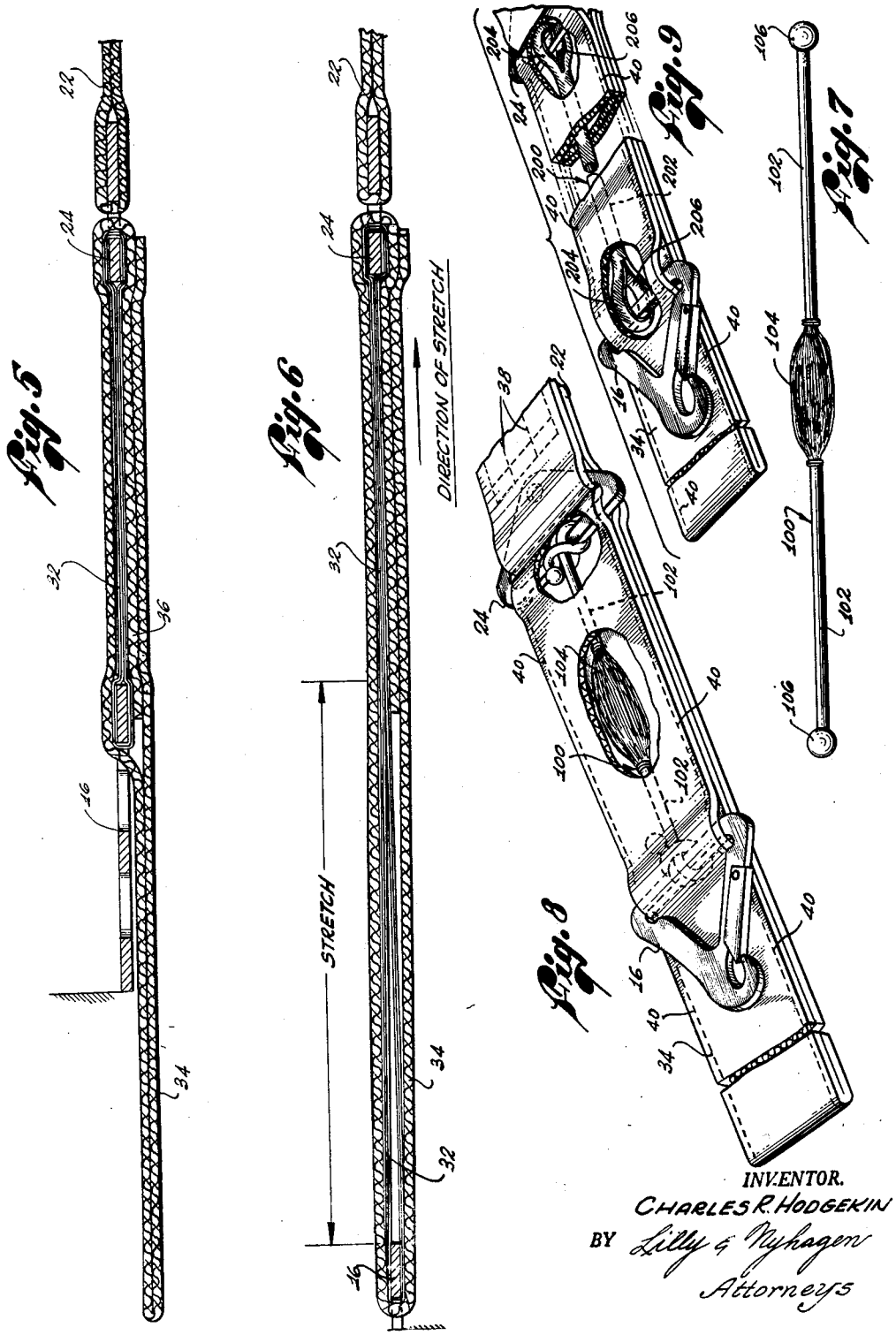

United States Patent Office 3,074,760
Patented Jan. 22, 1963

3,074,760
SHOCK ABSORBING COUPLING AND SAFETY
SEAT BELT EMBODYING THE SAME
Charles R. Hodgekin, Alliance, Ohio, assignor to Hardman Tool & Engineering Co., Los Angeles, Calif., a corporation of California
Filed Sept. 21, 1960, Ser. No. 57,511
5 Claims. (Cl. 297—386)

This invention deals generally with shock absorbing devices and, more particularly, with an improved shock absorbing coupling and a safety seat belt embodying the same.

One known type of safety seat belt is made up of separate, connected sections, at least one of which consists of a yieldable, energy absorption coupling or link that yields under a predetermined tensile load on the belt and absorbs energy as it yields. This link commonly comprises undrawn nylon, or some other plastically yieldable material, which undergoes inelastic elongation or stretching under load and absorbs energy as it yields.

The energy absorption links in these safety belts are designed so as to not yield under normal loads, such as occur in normal landings of an airplane or stops of an automotive vehicle, for example, but to yield only under a predetermined excessive load, somewhat below that which would cause injury to the person restrained by the belt or breaking of the belt, such as occurs in a crash landing or collision. During yielding of the belt in this way, a large portion of the kinetic energy of the person is absorbed over an interval of time, rather than instantaneously, and the deceleration force exerted on the person by the belt is reduced to a value below the injury threshold. An inelastically yieldable, energy absorption link of undrawn nylon, or other plastic yielding material, possesses the extremely important advantage that it becomes permanently stretched and does not tend to suddenly snap the person restrained by the belt backward when the load on the belt is removed as would occur with an elastically yieldable link.

The existing shock absorbing seat belts of this type possess two deficiencies which this invention seeks to overcome. The primary deficiency of the existing belts resides in the fact that yielding of the energy absorption links of the belts under load is not limited in any way. As a result, there is a possibility that during a severe impact, a belt may either fail or yield to such an extent as to permit the person restrained by the belt to strike a part of the vehicle.

The present invention cures this deficiency by providing a safety belt of the character described having a shock absorbing coupling including a yieldable, energy absorption link which is capable of yielding under a predetermined excessive load and absorbing energy as it yields, so as to achieve the advantages of the prior shock absorbing safety belts of this type, and a relatively non-yieldable or "fail-safe" link which limits yielding of the energy absorption link so as to provide the present belt with a predetermined maximum length to which it may stretch under load. The invention also provides certain unique energy absorption link constructions of undrawn nylon or other plastic yielding materials which are especially adapted to use in the present belt.

A second deficiency of the existing shock absorbing seat belts of the character described is that their energy absorption links are completely exposed so as to be prone to accidental damage as well as deliberate tampering and vandalism, attack by cleaning fluids and changes in their moisture content. This invention avoids this deficiency of the existing safety belts by completely enclosing or encapsulating the energy absorption link.

It will become clear as the description proceeds that while the present shock absorbing coupling and the energy absorption links are disclosed in connection with a safety belt, they are capable of use in other shock absorbing applications, such as in parachutes, seats, shoulder harnesses, and inertia reel straps.

With this preliminary discussion in mind, a general object of the invention may be stated as being the provision of a new and improved yieldable shock absorbing coupling and energy absorption link therefor and a safety belt embodying the same.

A more specific object of the invention is to provide a yieldable shock absorbing coupling and safety belt embodying the same in which yielding of the coupling under load is limited to a predetermined maximum length.

Another object of the invention is to provide a shock absorbing coupling and safety belt embodying the same of the character described in which the yieldable, energy absorption link of the coupling is completely enclosed or encapsulated so as to be protected against accidental damage, deliberate tampering and vandalism, attack by cleaning fluids, and changes in its moisture content.

Yet another object of the invention is to provide a new and improved yieldable, energy absorption link for seat belts and other shock absorbing applications.

Other objects, advantages and features of the invention will become readily apparent as the description proceeds.

The invention will now be described in detail by reference to the attached drawings, wherein:

FIG. 1 illustrates a person confined in a vehicle seat by means of the present safety belt prior to and after yielding of the belt under an impact load;

FIG. 2 is a perspective view, on enlarged scale, of the present safety belt;

FIG. 3 is an enlarged section taken along line 3—3 of FIG. 2;

FIG. 4 is a view of the energy absorption link embodied in the seat belt of FIG. 2;

FIG. 5 is an enlarged section, taken along line 5—5 of FIG. 2, through the shock absorbing coupling of the seat belt showing the coupling prior to yielding thereof under load;

FIG. 6 is a section similar to FIG. 5 showing the coupling after yielding under load;

FIG. 7 illustrates a modified energy absorption link which may be used in the seat belt of FIG. 2;

FIG. 8 illustrates the energy absorption link of FIG. 7 connected in a seat belt;

FIG. 9 illustrates a further modified energy absorption link of the invention; and FIG. 10 is a perspective view of one end of a modified safety belt of the invention.

In FIG. 1 of these drawings, the numeral 10 denotes a vehicle, which may be either an automotive vehicle or an airplane, for example, having a seat 12. The seat belt of this invention is indicated at 14. The ends (only one end visible in FIG. 1) of this seat belt are anchored in the usual way to the frame of seat 12, the belt passing up and over the mid section of a person 15 occupying the seat so as to restrain that person against being thrown forward during an impact.

As shown best in FIG. 2, the seat belt 14 is made up of several connected sections 16, 18, 20, 22, 24 and 26 and comprises a left-hand half 28 and a right-hand half 30. Section 16 at the rear end of each half of the belt is a slotted metal link which defines a hook for attaching the respective end to the frame of the vehicle seat 12. Section 18 at the forward end of the right-hand half 30 of the belt comprises a flexible strap and the section 20 at the forward end of the left-hand half 28 of the belt comprises a buckle which receives and is releasably connectable to the strap 18 for joining the forward ends of the two halves of the belt. Section 22 of the belt comprises a flexible strap, the forward end of which passes through a slot in the buckle 20 and is then folded on itself and stitched, as shown. Sections 24 of the belt comprise metal links having slots through which the rear ends of straps 18 and 22 pass, respectively, these ends of the straps then being folded on themselves and stitched, as shown. The remaining sections 26 of the belt each comprises an inner, yieldable energy absorption link 32, FIG. 3, which is connected at its ends to the adjacent metal links 16 and 24 in a manner to be presently described, and an outer, relatively non-yieldable link or strap loop 34. Each set of metal links 16 and 24 and the section 26 of the belt connecting the set of links together comprise the shock absorbing coupling of the invention.

Each energy absorption link 32 comprises a long, thin ribbon 36 (FIG. 4) of undrawn nylon or other suitable plastic yielding material. As shown best in FIG. 5, this ribbon is looped several times through the slots in the adjacent metal links 16 and 24 so as to form a multi-layer loop of undrawn nylon ribbon connecting these links. The ends of the ribbon are secured to the adjacent layer of the loop in any suitable manner.

The outer strap 34 of each section 26 of the belt, which may comprise a woven cloth belt, for example, passes through the slots in its respective metal links 16 and 24, as shown best in FIG. 5, and has its ends joined by stitching 38 so as to form a flat loop. The length of this loop is greater, by a predetermined amount, than the length of the energy absorption loop or link 32 prior to stretching of the latter, as is readily evident in FIG. 5. Because of its longer length, one end of each loop 34 extends rearwardly beyond the adjacent hook link 16.

The longitudinal edges of loops 34 are joined, such as by stitching 40, so that the energy absorption links 32 are completely enclosed within the loops and thereby protected against accidental damage as well as deliberate tampering and vandalism.

The energy absorption links 32 are so designed that they will not yield or stretch under normal loads on the safety belt 14, such as occur during normal landings of an aircraft or stops of an automotive vehicle. Under these normal load conditions, then, the present seat belt acts as a conventional, non-yielding seat belt. The energy absorption links 32 are designed to yield or stretch at a predetermined excessive load on the seat belt, such as occurs during an impact, which is somewhat less than that which would result in injury to the person restrained by the belt or cause breaking of the belt. During such an impact, then, the energy absorption links 32 yield or stretch under the load exerted on the belt due to the forward momentum of the person confined thereby. During this stretching of the links, the latter absorb a large portion of the kinetic energy of the forwardly moving body of the person confined by the belt, resulting in deceleration of the person over an interval of time, rather than instantaneously, with a resultant reduction in the deceleration force exerted on the person to a safe value.

It will be observed in FIG. 6 that when the energy absorption link 32 in each half of the belt stretches in this way, the rear end of the respective non-yieldable loop 34 is drawn toward its metal link 16 with a resultant shearing of the stitchings 40 in the extending end of the loop by that link. This shearing of the stitches, of course, absorbs a certain amount of the kinetic energy of the person restrained by the belt.

Yielding or stretching of each energy absorption link 32 is limited to the distance indicated in FIG. 6 wherein the link 16 engages the rear end of its loop 34 which then acts as a relatively non-yieldable connection or link between the link 16 and the link 24 to prevent any further yielding of the energy absorption link. The outer loops 34 thus act as positive restraining links which limit yielding of the energy absorption links 32 and, therefore, also the increase in the effective length of the safety belt under load. After the belt has stretched to this predetermined maximum length, the person confined by the belt is positively restrained against further forward movement, as indicated in phantom lines in FIG. 1.

FIG. 7 illustrates an alternative form of energy absorption link 100 which may be used in the present shock absorbing coupling and safety belt. This modified energy absorption link comprises a cord made of woven nylon strands, or strands of some other suitable plastic yielding material, end portions 102 of which are predrawn and the center portion 104 of which is left undrawn. This energy absorption link is fastened to the links 16 and 24 of the shock absorbing coupling or safety belt by knotting the predrawn ends 102 of the link to the metal links 16 and 24, in the manner illustrated in FIG. 8. As in the previous form of the safety belt, the energy absorption link 100 is enclosed with a relatively non-yieldable, outer restraining loop or link 34 which acts to limit yielding of the energy absorption link under load. The longitudinal edges of this loop are stitched together, as before, to enclose the energy absorption link and protect the latter against accidental damage as well as deliberate tampering and vandalism. Preferably, the extreme ends of the energy absorption link are enlarged, as indicated at 106, to prevent accidental loosening of the knotted ends of the link.

FIG. 9 illustrates yet another form of energy absorption link 200 according to the invention. This link comprises a strand of undrawn nylon or other suitable plastically yieldable material which is woven into a cord 202 having loops 204 at its ends. These loops contain metal thimbles 206 that receive the slotted metal links 16 and 24 of the shock absorbing coupling or seat belt, as shown. As in the previous forms of the invention, the link 200 is enclosed or encapsulated within the outer, stitched restraining loop 34 which acts to positively limit yielding of the link 200.

Other forms of energy absorption links can obviously be used in the present shock absorbing coupling. For example, the link might comprise several bonded laminations of undrawn nylon or other plastically yieldable material or may consist of separate, spliced sections which are connected at their ends to the slotted metal links 16 and 24 of the coupling.

FIG. 10 illustrates one end of yet another version of the present shock absorbing safety seat belt in which the yieldable shock absorbing links of the previous forms of the invention are omitted and the necessary shock absorbing action is furnished by shearing of stitches. This modified belt comprises, as before, a hook link 16 for connection to the seat frame and a slotted link 24 which is secured to the non-yielding strap section 22 of the belt.

Passing through the slots in links 16 and 24 is a strap loop 300 which is similar to the strap loops 34 in the safety belt of FIG. 2. The two sides of the loop are stitched together between the links 16 and 24, as shown at 302.

As in the earlier forms of the invention, one end of the loop extends beyond the link 16, as shown. The two sides of this extending end of the loop are joined by several rows 304 of stitches. These rows of stitches extend from the crosspiece 16' of link 16, which crosspiece extends through the loop 300 and the remote, closed end of the loop.

The other end (not shown) of the safety belt is identical with the end just described, these two ends of the belt being releasably connected by means of a buckle (not shown) as before.

In this form of the invention, it is evident that a tensile load on the safety belt tends to pull the loop 300 through the slotted link 26. Pulling of the loop through the link, however, is resisted by engagement of the rows 304 of stitches in the loop with the crosspiece 16' of the link.

The crosspiece is thereby urged against and tends to shear or sever the rows 304 of stitches.

These rows of stitches are designed, by use of a thread of appropriate strength and provision of an appropriate number of rows, to restrain the loop against pulling through the link 16 under normal loads on the safety belt such as occur during normal decelerations of an automobile or normal landings of an aircraft and, at some predetermined excessive load below the threshold of injury to the person restrained by the belt, to be sheared or severed by the crosspiece 16' of link 16 with resultant pulling of the loop through the link. This shearing or severing of the stitches by the link absorbs kinetic energy of the person restrained by the belt and thereby provides a shock absorbing action. Eventually, the closed end of the loop engages the crosspiece of the link whereupon the loop provides an unyielding connection between links 16 and 24 which positively limits forward movement of the person restrained thereby, as in the earlier forms of the invention. Other stitching patterns than the illustrated rows, of course, may be used.

It is obvious that while the different forms of undrawn nylon energy absorption links of the invention as well as the present shock absorbing couplings have been disclosed in connection with a safety belt, they are capable of other shock absorbing applications.

Clearly, therefore, the invention hereinabove described and illustrated is fully capable of attaining the objects and advantages preliminarily set forth.

Numerous modifications in the design and arrangement of parts of the invention are obviously possible within the spirit and scope of the following claims.

What is claimed is:

1. A shock absorber for seat belts and the like comprising a pair of metal links, a stretchable energy absorption element connecting said links which stretches under a predetermined tensile stress applied to the element through said links and absorbs energy as it stretches, each link having an opening therethrough, and a relatively non-stretchable strap extending through the openings in said links and having its ends permanently joined to form a loop permanently connecting said links, the length of said loop being such that the loop accommodates limited stretching of said element under stress and then becomes taut to form a relatively non-yieldable connection between said links.

2. A shock absorber for seat belts and the like comprising a pair of metal links, a stretchable energy absorption element connecting said links which stretches under a predetermined tensile stress applied to the element through said links and absorbs energy as it stretches, each link having an opening therethrough, a relatively non-stretchable strap extending through the openings in said links and having its ends permanently joined to form a loop permanently connecting said links, said loop being flattened whereby the loop has two ends, one of said links being located at one end of said loop and the length of said loop measured between said ends being appreciably greater than the length of said element in its normal unstretched condition whereby the other link is located a distance from the other end of said loop, and stitching joining the two sides of said loop in the area between said other link and said other end of said loop.

3. A shock absorber for seat belts and the like comprising a pair of metal links each having an opening therethrough, a relatively non-stretchable strap extending through said openings and having its ends permanently joined to form a loop permanently connecting said links, said loop being flattened whereby the loop has two ends, one of said links being located at one end of said loop and the other link being located at a position between said loop ends, and stitching joining the two sides of said loop in the area between said other link and the other end of said loop.

4. A shock absorption element for seat belts and the like comprising a cord made of interwoven strands of a plastically yieldable material, the end portions of said cord being predrawn whereby said ends are relatively non-stretchable and the center of said cord being undrawn so as to be stretchable under a predetermined tensile stress.

5. A shock absorber for seat belts and the like comprising a pair of metal links, a stretchable energy absorption element including a cord attached at its ends to said links, respectively, and made of interwoven strands of a plastically yieldable material, the end portions of said cord being predrawn, whereby said end portions are relatively non-stretchable, and the center portion of said cord being undrawn so as to be stretchable under a predetermined tensile stress, each link having an opening therethrough, and a relatively non-stretchable strap extending through the openings in said links and having its ends permanently joined to form a loop permanently connecting said links, the length of said loop being such that the loop accommodates limited stretching of said element under stress and then becomes taut to form a relatively non-yieldable connection between said links.

References Cited in the file of this patent

UNITED STATES PATENTS

| | | |
|---|---|---|
| 1,925,260 | Krein | Sept. 5, 1933 |
| 2,132,616 | Hardie | Oct. 11, 1938 |
| 2,613,865 | Rose | Oct. 14, 1952 |
| 2,639,852 | Sanders | May 26, 1953 |
| 2,871,927 | Materi | Feb. 3, 1959 |